(12) United States Patent
Arramreddy

(10) Patent No.: US 7,076,591 B2
(45) Date of Patent: *Jul. 11, 2006

(54) PCI ARBITER WITH HOT PLUG CONTROLLER SUPPORT

(75) Inventor: Sujith K. Arramreddy, San Jose, CA (US)

(73) Assignee: Serverworks Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/901,832

(22) Filed: Jul. 29, 2004

(65) Prior Publication Data

US 2004/0268002 A1    Dec. 30, 2004

Related U.S. Application Data

(63) Continuation of application No. 09/637,845, filed on Aug. 10, 2000, now Pat. No. 6,772,263.

(51) Int. Cl.
*G06F 13/00* (2006.01)

(52) U.S. Cl. .................... 710/302; 710/301
(58) Field of Classification Search ......... 710/300–304
See application file for complete search history.

(56) References Cited

U.S. PATENT DOCUMENTS

| | | | |
|---|---|---|---|
| 5,784,576 A * | 7/1998 | Guthrie et al. | 710/302 |
| 6,035,355 A * | 3/2000 | Kelley et al. | 710/302 |
| 6,170,029 B1 * | 1/2001 | Kelley et al. | 710/302 |
| 6,286,066 B1 * | 9/2001 | Hayes et al. | 710/302 |
| 6,338,107 B1 * | 1/2002 | Neal et al. | 710/302 |
| 6,363,452 B1 * | 3/2002 | Lach | 710/316 |

FOREIGN PATENT DOCUMENTS

| | | |
|---|---|---|
| EP | 0 990 973 A1 | 4/2000 |
| EP | 1 011 050 A1 | 6/2000 |

OTHER PUBLICATIONS

EP Search Report for European Application No. 01250290.2, dated Sep. 16, 2003.
Alan Goodrum, "PCI Hot-Plug Application & Design," Annabooks, pp. 31-51 (1998).

* cited by examiner

*Primary Examiner*—Tim Vo
(74) *Attorney, Agent, or Firm*—Christie, Parker & Hale, LLP

(57) ABSTRACT

A Hot Plug system includes a PCI bus, an expansion card, a slot for receiving the expansion card, and a Hot Plug controller directly connected to the expansion card and the slot, but only indirectly connected to the PCI bus. An enhanced arbiter monitors and controls the PCI bus on behalf of the Hot Plug controller, thereby allowing the Hot Plug controller to be disconnected from the PCI bus and reducing a critical load on the PCI bus. Because the Hot Plug controller no longer needs to perform monitoring and controlling functions on the PCI bus, the logic within the Hot Plug controller can be significantly simplified. However, the Hot Plug controller still maintains direct control over the expansion slots and associated expansion cards. In one embodiment, the enhanced arbiter with Hot Plug capability is implemented with a bridge on a chipset.

22 Claims, 6 Drawing Sheets

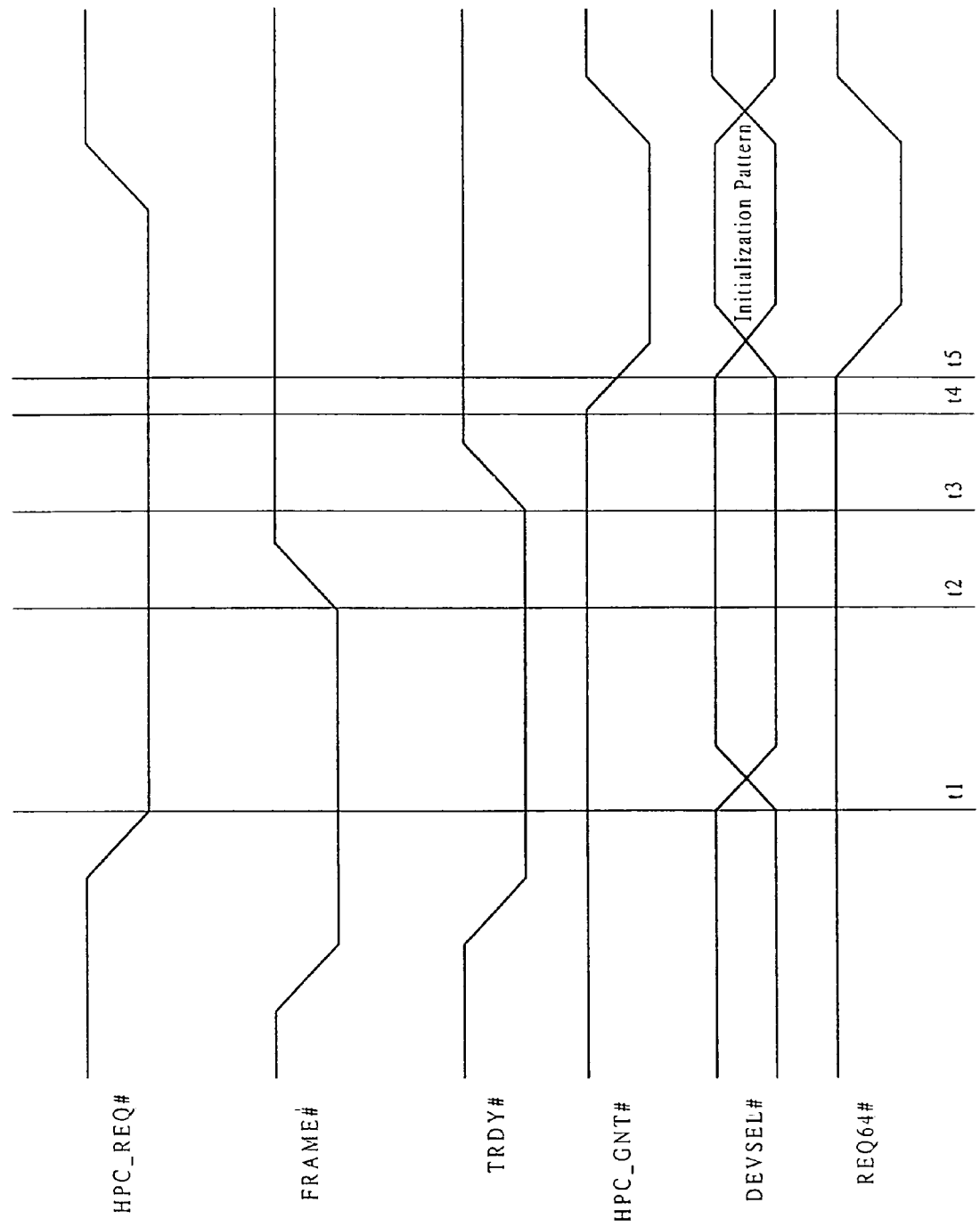

PCI ARBITER WITH HOT PLUG CONTROLLER SUPPORT

CROSS-REFERENCE TO RELATED APPLICATION(S)

The present application is a continuation of U.S. patent application Ser. No. 09/637,845, filed Aug. 10, 2000, now issued as U.S. Pat. No. 6,772,263, entitled "PCI ARBITER WITH HOT PLUG CONTROLLER SUPPORT," the contents of which are herein incorporated by reference.

BACKGROUND OF THE INVENTION

1. Field of the Invention

The present invention relates to a Hot Plug controller, and specifically to a Hot Plug controller that provides Hot Plug capability to an expansion slot on a PCI bus without an associated load on the PCI bus.

2. Description of the Related Art

A peripheral component interconnect (PCI) bus is an industry standardized expansion bus that conveys much of the information and signals of a computer system. In light of the miniaturization of computer systems, leading to notebooks and palm computers, expansion cards were created to provide memory space and/or input/output devices to expand the systems functionality. The term "PCI Hot Plug" refers to the process of inserting, removing, or replacing the PCI expansion cards in a computer system without having to turn off the system.

The logic necessary to implement the PCI Hot Plug includes a Hot Plug controller in addition to a number of discrete components. These components typically include bus switches for isolating the expansion cards from the PCI bus, a power controller and associated field effect transistors (FETs) for controlling the power supply to the expansion cards, and light emitting diodes (LEDs) for indicating the state of the expansion cards. One of the functions of the Hot Plug controller is to monitor and control the activity of the PCI bus during the insertion, removal, or replacement of an expansion card.

FIG. 1 illustrates a typical Hot Plug bus system 100 including a PCI bus 104, two expansion cards 102A and 102B connected to PCI bus 104 via slots 103A and 103B, respectively, and a Hot Plug controller 101 coupled to slots 103 as well as to PCI bus 104 via a bus 108.

Hot Plug controller 101 controls a number of critical operations associated with slots 103A and 103B via connectors 105A and 105B, respectively. Specifically, in each set of connectors 105, one connector controls power and the other connector controls PCI bus signals. Thus, by using connectors 105A for example, Hot Plug controller 101 can control the power and PCI bus signals for slot 103A and associated expansion card 102A. Connectors 105 typically include bus switches (i.e., transfer gates) implemented by FETs. When a FET is turned on, it functions similar to a 5 Ohm resistor. However, when a FET is turned off, it functions similar to a 1 MOhm resistor.

In this manner, Hot Plug controller 101 can isolate an individual slot 103 (and hence its associated expansion card 102) from PCI bus 104 and can power down each card 102 during insertion, removal, or replacement. Moreover, Hot Plug controller 101 provides the power-up and power-down sequences for expansion cards 102 to meet the electrical requirements of PCI bus 104. Hot Plug controller 101 also provides additional signals to expansion cards 102. Although only the reset signal PRST is shown, other signals well known to those in the art are also provided. Exemplary signals are described in detail in "PCI Hot-Plug Application & Design", by Alan Goodrum, pages. 31–37, published by Annabooks in 1998, and incorporated by reference herein. Finally, Hot Plug controller 101 generates a state indicator 106 (indicating slot power on or slot power off) as well as an attention indicator 107 (providing a predetermined color or flashing light) to draw a user's attention to a particular slot 103 (indicating card inserted or swap ready).

Note that Hot Plug controller 101 is controlled by software (not described in detail herein, but well known to those skilled in the art). In this manner, a user can provide requests to a standard peripheral device of a computer system, such as a keyboard, and the corresponding request is translated into software, which is then provided to Hot Plug controller 101.

The PCI Hot Plug specification supports three different types of operations: Hot Add, Hot Remove/Delete, and Hot Swap. In a typical computer system, to provide the above-described operations, Hot Plug controller 101 monitors PCI bus 104. A typical Hot Plug controller 101 monitors these signals directly via bus 108, thereby providing an electrical load on PCI bus 104.

The PCI bus specification defines ten (10) electrical loads as a maximum limit when PCI bus 104 operates at 33 MHz and five (5) loads at 66 MHz. Each slot 103 is counted as two loads (a first load for expansion card 102 and a second load for connectors 105). Moreover, in a typical PCI bus, at least one master (explained in detail below) is connected to PCI bus 104. Thus, at 66 MHz, system 100 cannot provide Hot Plug capability because the maximum number of loads would be exceeded. Because the electrical loads on a PCI bus are at a premium, a need arises for a system and method to decrease the number of loads on the bus, thereby allowing Hot Plug capability at maximum speed and increasing system functionality.

SUMMARY OF THE INVENTION

In accordance with the present invention, a Hot Plug system includes a PCI bus, an expansion card, a slot for receiving the expansion card, and a Hot Plug controller directly connected to the expansion card and the slot, but only indirectly connected to the PCI bus.

The present invention uses an enhanced arbiter to monitor and control the PCI bus on behalf of the Hot Plug controller, thereby allowing the Hot Plug controller to be disconnected from the PCI bus and reducing a critical load on the PCI bus. Because the Hot Plug controller no longer needs to perform monitoring and controlling functions on the PCI bus, the logic within the Hot Plug controller can be significantly simplified. However, the Hot Plug controller of the present invention still maintains direct control over the expansion slots and associated expansion cards. In one embodiment, the enhanced arbiter with Hot Plug capability is implemented with a bridge on a chipset.

BRIEF DESCRIPTION OF THE DRAWINGS

FIG. 3B illustrates a timing diagram of a request grant sequence in accordance with one embodiment of the invention.

DETAILED DESCRIPTION OF THE INVENTION

To ensure accurate transmission of information in a computer system, a PCI bus design includes a bus controller, also called an arbiter, to control bus transfers. A device that takes control of the bus to handle its own transfer is termed a "master", whereas a device that receives data from the master is termed a "target." The arbiter determines which master can take control of the bus and the time period of that control.

In a typical computer system, a local bus connected to the microprocessor and at least one PCI bus are interconnected via a bridge. This bridge, implemented on an ASIC or on a chipset, automatically converts data formats and protocols, if necessary, for accurate data transfer. To increase the number of expansion cards connected to the system, thereby significantly increasing its functionality, multiple PCI buses can also be interconnected using one or more bridges. In PCI architecture, a maximum of 256 PCI buses can be interconnected in a single computer system.

Figure 1:
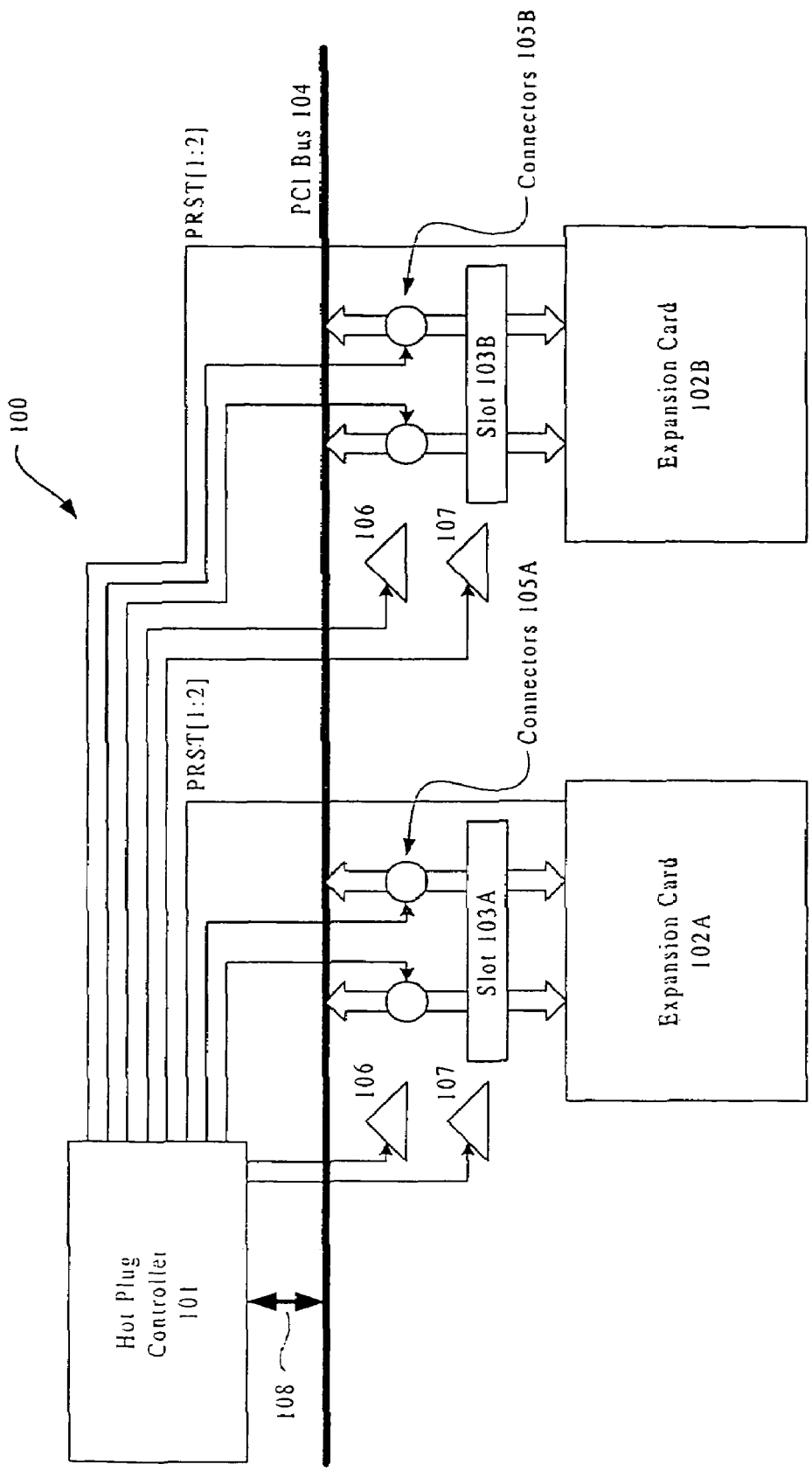
FIG. 1 illustrates a block diagram of a prior art PCI Hot Plug bus system.
Figure 2:
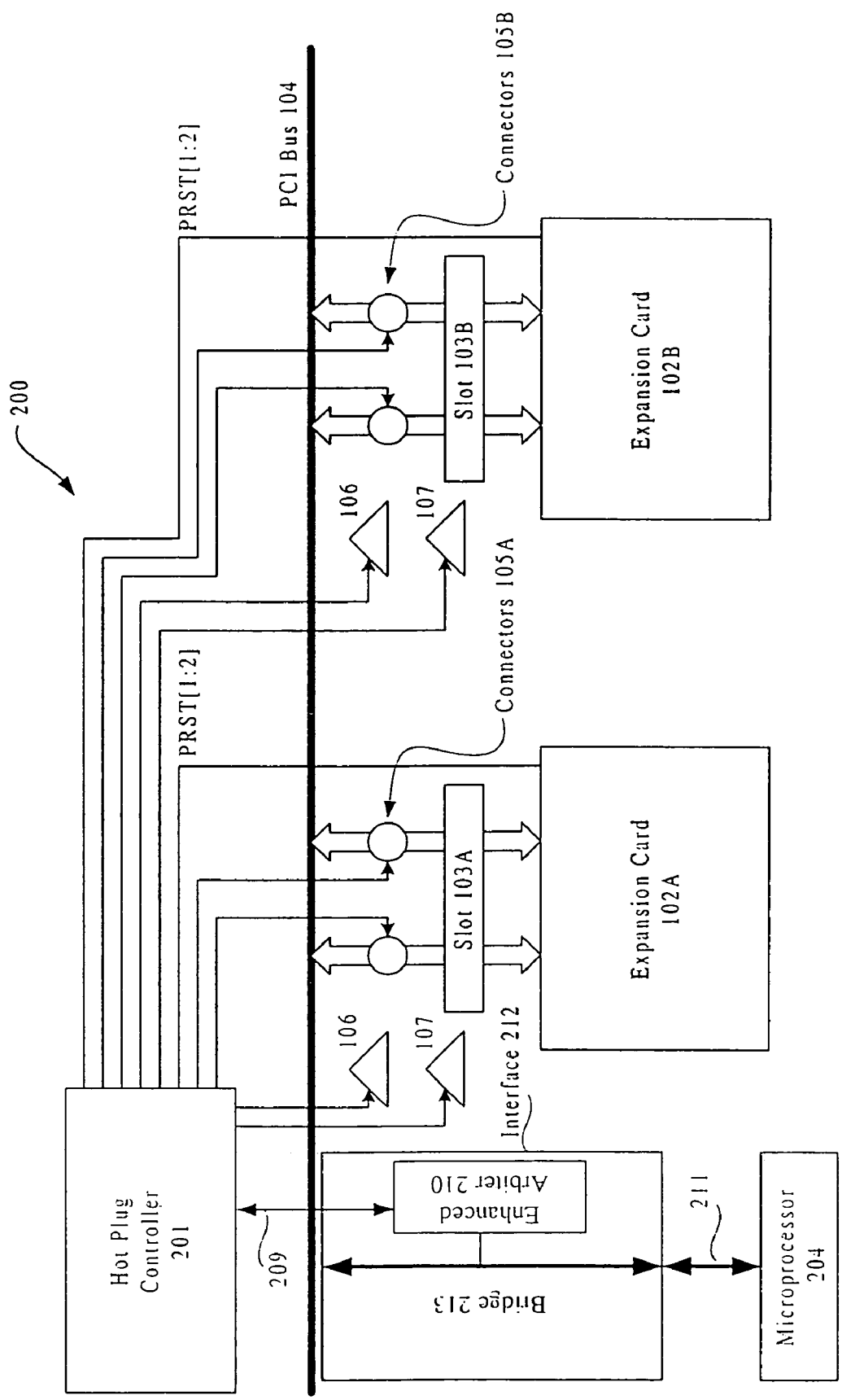
FIG. 2 illustrates a block diagram of a computer system in accordance with the present invention.

FIG. 2 illustrates a computer system 200 in accordance with the present invention. System 200 includes an interface 212, which monitors and controls PCL bus 104. Specifically, interface 212 includes an enhanced arbiter 210, which when authorized by a microprocessor 204 via a local bus 212 and a bridge 213, monitors and controls PCI bus 104 via bridge 213. Enhanced arbiter 210 communicates with a Hot Plug controller 201 via a bus 209. Note that Hot Plug controller 201 controls slots 103 and expansion cards 102 in a conventional manner (see FIG. 1), and therefore is not described in detail herein.

Bus 209 includes a request and grant pair, which are either dedicated or non-dedicated, wherein other masters (not shown) could use the pair if non-dedicated. In a PCI design of the present invention, arbitration includes the following steps. Hot Plug controller 201, like a typical master, asserts a request signal (REQ) when it wants to take control of PCI bus 104. Note that this request is typically triggered by an end user providing a request signal via a peripheral device (not shown) to computer system 200, which is then translated to a software command provided to Hot Plug controller 201.

Typically, each master coupled to a PCI bus has its own dedicated REQ and GNT lines coupled to an arbiter. The arbiter then determines which master should get ownership of the PCI bus and asserts the GNT line associated with that master.

The present invention advantageously eliminates the need for Hot Plug controller 201 to directly monitor and control PCI bus 104 as a typical master, thereby reducing a critical load on PCI bus 104. In light of this reduced functionality, Hot Plug controller 201 no longer needs to include the logic to perform those monitoring and controlling functions. Instead, in accordance with the present invention, enhanced arbiter 210 provides the monitoring and controlling functions on behalf of Hot Plug controller 201.

Note that an end user could disable the PCI bus interface on a standard Hot Plug controller (FIG. 1) and use that controller with enhanced arbiter 210 to provide Hot Plug capability. In this manner, standard Hot Plug controllers, which vary significantly between manufacturers, may still be used in accordance with the present invention.

Interface 212, which includes bridge 213 and enhanced arbiter 210, provides only one load on PCI bus 104. In this manner, the present invention allows Hot Plug capability on PCI bus at high speeds, such as 66 MHz, while still providing increased system functionality via expansion slots 103A/103B and associated expansion cards 102A/102B.

Figure 3A:
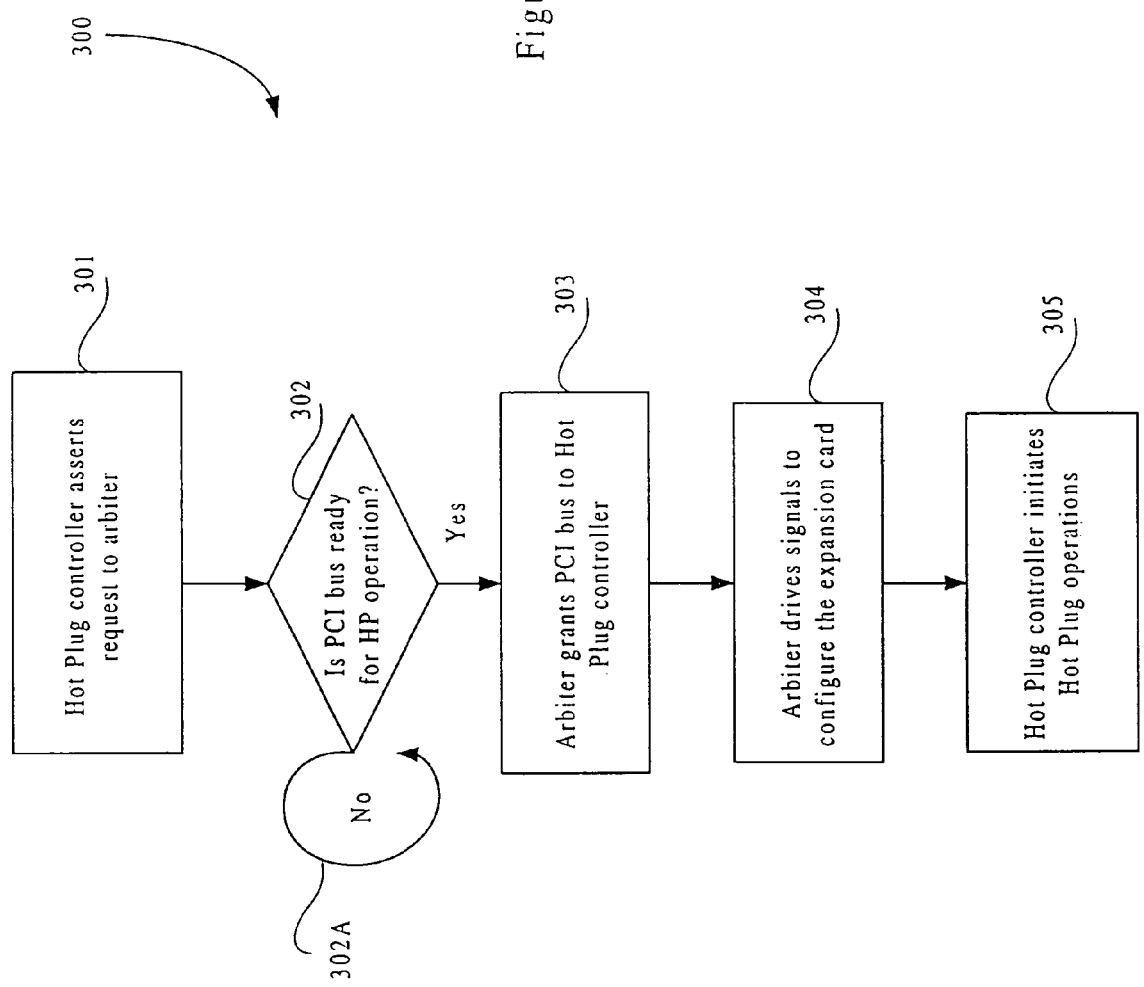
FIG. 3A illustrates a flow chart of a Hot Swap operation supported in a PCI Hot Plug specification.

FIG. 3A illustrates a flow chart 300 of a generic sequence of communications between a Hot Plug controller and an enhanced arbiter of the present invention. To control the PCI bus, the Hot Plug controller asserts a request to the enhanced arbiter in step 301. After sampling the request, the enhanced arbiter determines whether the PCI bus is ready for Hot Plug operation in step 302. If the PCI bus is not ready for Hot Plug operation, the Hot Plug controller enters a loop 302A until the PCI bus is ready. At that point, the enhanced arbiter asserts the grant to the Hot Plug controller in step 303, thereby allowing a Hot Plug operation to begin.

In addition to monitoring request signals from and asserting grant signals to the Hot Plug controller, the arbiter of the present invention also drives the signals that configure the device which is Hot Plugged (i.e. the expansion cards) in step 304. Exemplary signals, including REQ64#, PCIXCAP, M66EN, and DEVSEL#, are used to configure the speed and width of the PCI bus (described in further detail below). Once the grant is asserted to the controller and the device is configured, the Hot Plug controller initiates the Hot Plug operations in step 305.

In accordance with the present invention, any arbitration algorithm can be used. Illustrative arbitration algorithms are described in detail in U.S. patent application [RCC-001], entitled "Peripheral Component Interconnect Arbiter Implementation With Dynamic Priority Scheme", filed on Aug. 10, 2000, and incorporated by reference herein. In one embodiment, enhanced arbiter 210 (FIG. 2) treats the request/grant pair as a non-premptable request/grant pair. In this manner, once Hot Plug controller 201 begins an expansion card insertion, removal, or replacement operation, another master (not shown) cannot interrupt this operation. Note that during any of these Hot Plug operations, PCI bus 104 is quiesced by enhanced arbiter 210. Irrespective of the arbitration algorithm used, enhanced arbiter 210 samples signals on PCI bus 104 to determine when appropriate action should be taken by either masters or slaves. For example, enhanced arbiter 210 samples standard PCI control signals, such as Cycle Frame (FRAME#), Initiator Ready (IRDY#), Target Ready (TRDY#) and Stop (STOP#) signals.

FIG. 3B illustrates an exemplary request and grant sequence in accordance with the present invention. At time t1, the Hot Plug controller asserts an HPC_REQ# signal (active low) to gain exclusive access to the PCI bus. This signal's functionality is different from any other PCI master request signal. Specifically, the Hot Plug controller asserts the HPC_REQ# signal only to quiesce the PCI bus, not to run any subsequent PCI cycles. Note that this request has the same priority as any other PCI request signal.

At time t2, the Hot Plug controller asserts a FRAME# signal, which identifies the beginning of a data transfer cycle and that the PCI bus holds a valid address. (Note that times t1–t5 are not necessarily performed in consecutive clock cycles. Therefore, any number of clock cycles may be included between any two of the indicated times.) The TRDY# signal (active high), asserted by a target at time t3, indicates that the target (such as one of expansion cards 102) is ready to supply data during a read cycle or accept data during a write cycle.

After the Hot Plug controller has won the PCI arbitration and the PCI bus is idle, the Hot Plug controller asserts the grant signal HPC_GNT# (active low) at time t4. The Hot Plug controller also drives the REQ64# signal (active low), which identifies the bit slot number, as well as the PCI initialization pattern (part of the DEVSEL# signal) at time t5. The value of the initialization pattern is determined for the values latched during the last frequency change request (or power reset configuration).

Other illustrative signals sampled by the enhanced arbiter (not shown in FIG. 3B) include the M66EN signal, which identifies the frequency of the bus (i.e., 66 MHz), the PCIXCAP1/PCIXCAP2 signals, which identify the maximum and alternate maximum decoupling capacitance of the slot-power switch, the IRDY# signal, which indicates that a master (such as enhanced arbiter 210) is ready to complete an ongoing transaction, and the STOP# signal, which indicates that the current transaction is complete (typically sent from a target (such as one of expansion cards 102) to a master (such as enhanced arbiter 210).

As mentioned previously, the PCI Hot Plug specification supports three different types of operations: Hot Add, Hot Remove/Delete, and Hot Swap. Each of these operations comprises standard phase sequences including: Power Enable Phase Clock Enable Phase, Bus Enable Phase, Reset Phase, and Power Disable Phase. The "PCI Hot-Plug Application & Design", written by Alan Goodrum, published by Annabooks in 1998, pages 31–50, describes these operations and the standard phase sequences, and therefore is not described in detail herein.

In one embodiment of the present invention, microprocessor 204, interface 212 (including bridge 213 and enhanced arbiter 210), Hot Plug controller 201, PCI bus 104 and slots 103, and each expansion card 102 are implemented on separate integrated circuits (thus, six chips in this embodiment). In this manner, Hot Plug controller 201 can be advantageously implemented on a chip running at a relatively slow speed, for example 8 MHz, whereas enhanced arbiter 210 can be implemented on another chip running at the speed of PCI bus 104.

Figure 4:
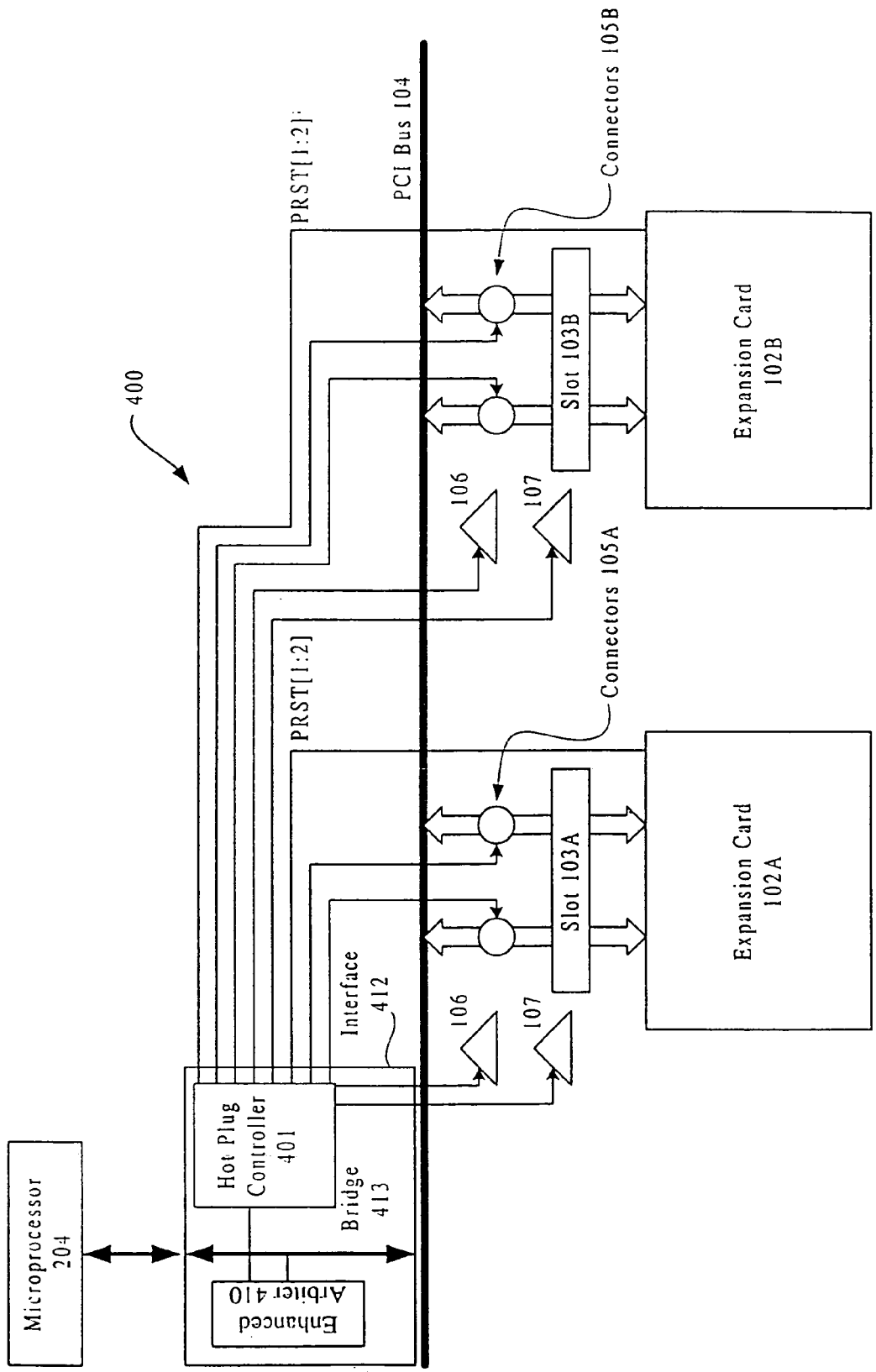
FIG. 4 illustrates a block diagram of another computer system in accordance with the present invention.

In another embodiment of the present invention illustrated in FIG. 4, a computer system 400 includes an interface 412 incorporating an enhanced arbiter 410, a bridge 413, and a Hot Plug controller 401 on the same chip, thereby reducing the number of chips necessary to implement Hot Plug functionality. However, note that Hot Plug controller 401 still neither monitors nor controls PCI bus 104. Specifically, the monitoring and controlling of PCI bus 104 is performed for Hot Plug controller 401 by enhanced arbiter 410.

Figure 5:
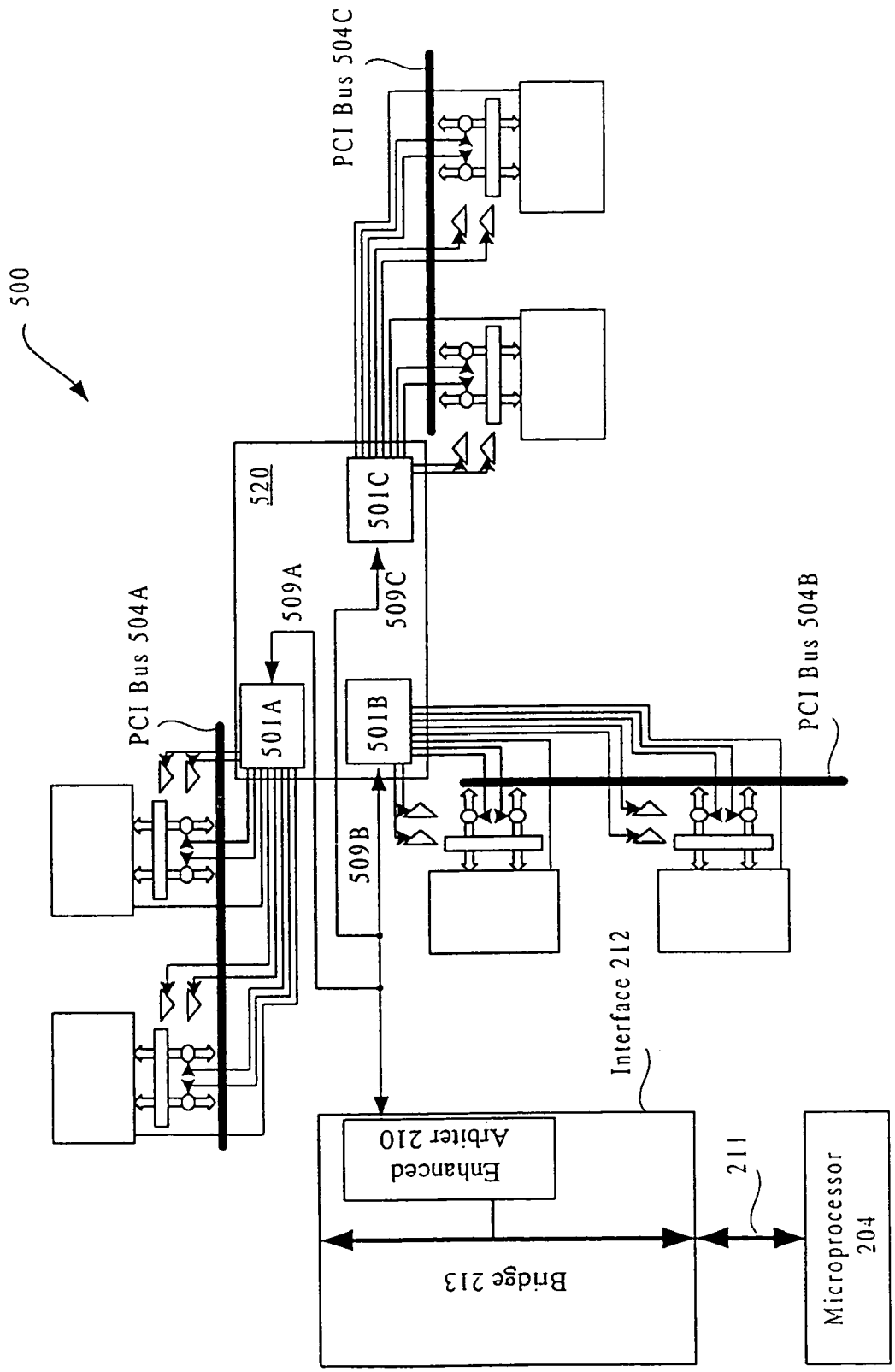
FIG. 5 illustrates a block diagram of multiple Hot Plug controllers on a common chip associated with multiple PCI buses.

In yet another embodiment of a computer system 500 in accordance with the present invention shown in FIG. 5, multiple Hot Plug controllers 501A, 501B, and 501C are consolidated on one chip 520. Hot Plug controllers 501A, 501B, and 501C are associated with expansion cards connected to PCI buses 504A, 504B, and 504C, respectively. Note that although controllers 501 are shown as logic entities within chip 520, in practice, much of the logic needed by these controllers can be time-shared, thereby eliminating significant duplication of logic. Illustrative logic that can be shared includes the bus interface used to communicate with the microprocessor, the state machine used in the Hot Plug sequences, and the registers used by the software interface. Although not shown for clarity in FIG. 5, PCI buses 504 are connected to bridge 213.

The specific embodiments of the present invention are presented for purposes of description and illustration only. These embodiments are not intended to be exhaustive or to limit the invention in any way. Those skilled in the art will recognize modifications and variations to the present invention. For example, the number of Hot Plug controllers, PCI buses, expansion slots, and expansion cards will vary from one embodiment to another. Moreover, although 66 MHz is indicated as a "high" speed system in the above description, the present invention is equally applicable to systems with different speeds, including those faster than 66 MHz. Therefore, the present invention is only defined by the appended claims.

What is claimed is:

1. A peripheral component interconnect (PCI) computer architecture, comprising:
   a Hot Plug controller running at a first speed;
   a PCI bus running at a second speed;
   an expansion slot;
   an expansion card coupled to the Hot Plug controller via the expansion slot; and
   an arbiter coupled between the Hot plug controller and the PCI bus;
   wherein the Hot Plug controller is only indirectly connected to the PCI bus and couples the expansion card and the expansion slot to the PCI bus through grants from the arbiter.

2. The PCI computer architecture of claim 1, wherein the arbiter is running at the second speed.

3. The PCI computer architecture of claim 2, wherein the first speed is less than the second speed.

4. The PCI computer architecture of claim 3, wherein the first speed is about 8 MHz and wherein the second speed is about 66 MHz.

5. The PCI computer architecture of claim 1, wherein the Hot Plug controller is implemented in a first chipset running at the first speed.

6. The PCI computer architecture of claim 5, wherein the arbiter is implemented in a second chipset running at the second speed.

7. The PCI computer architecture of claim 1, further comprising a second Hot Plug controller coupled to the arbiter, the first Hot Plug controller and the second Hot Plug controller sharing a logic.

8. The PCI computer architecture of claim 7, wherein the first Hot Plug controller and the second Hot Plug controller are implemented in a single chipset.

9. The PCI computer architecture of claim 8, further comprising:
   a second PCI bus coupled to the arbiter;
   a second expansion slot; and
   a second expansion card coupled to the second Hot Plug controller via the second expansion slot;
   wherein the second Hot Plug controller is only indirectly connected to the second PCI bus and couples the second expansion card and the second expansion slot to the second PCI bus through grants from the arbiter.

10. A peripheral component interconnect (PCI) computer architecture, comprising:
    a plurality of Hot Plug controllers that share a logic;
    an expansion slot including a connector, the connector coupling one of the plurality of Hot Plug controllers to the expansion slot;
    a PCI bus corresponding to the one of the plurality of Hot Plug controllers; and
    an arbiter coupled between the plurality of Hot Plug controllers and the PCI bus;

wherein the arbiter monitors and controls the PCI bus for the one of the plurality of Hot Plug controllers to indirectly connect the one of the plurality of Hot Plug controllers to the PCI bus.

11. The PCI computer architecture of claim 10, wherein the one of the plurality of Hot Plug controllers is running at a first speed and wherein the PCI bus is running at a second speed.

12. The PCI computer architecture of claim 11, wherein the first speed is less than the second speed.

13. The PCI computer architecture of claim 12, wherein the first speed is about 8 MHz and wherein the second speed is about 66 MHz.

14. The PCI computer architecture of claim 11, wherein the arbiter is running at the second speed.

15. The PCI computer architecture of claim 10, wherein the one of the plurality of Hot Plug controllers is implemented in a first chipset running at a speed slower than a running speed of the PCI bus.

16. The PCI computer architecture of claim 15, wherein the arbiter is implemented in a second chipset running at the running speed of the PCI bus.

17. The PCI computer architecture of claim 10, further comprising an expansion card inserted into the expansion slot, wherein the one of the plurality of Hot Plug controllers couples the expansion card and the expansion slot to the PCI bus via the connector and in accordance with grants from the arbiter.

18. A method of providing Hot Plug capability in a peripheral component interconnect (PCI) computer architecture, the method comprising:
running a first Hot Plug controller at a speed slower than a running speed of a PCI bus;
monitoring one or more characteristics of the PCI bus and controlling the PCI bus using an arbiter and without using the first Hot Plug controller;
using the first Hot Plug controller to provide a Hot Plug capability; and
granting by the arbiter a request from the first Hot Plug controller to couple an expansion slot to the PCI bus to provide the Hot Plug capability via the expansion slot;
wherein the arbiter is running at the speed of the PCI bus.

19. The method of claim 18, further comprising:
running a second Hot Plug controller coupled to the arbiter; and
sharing a logic of the first Hot Plug controller and the second Hot Plug controller.

20. The method of claim 19, further comprising:
running a second Hot Plug controller having a characteristic that differs from the first Hot Plug controller;
using the second Hot Plug controller to provide a second Hot Plug capability; and
granting by the arbiter a request from the second Hot Plug controller to couple the expansion slot to the PCI bus to provide the second Hot Plug capability via the expansion slot.

21. The method of claim 20, wherein the second Hot Plug controller can be used as a substitute for the first Hot Plug controller.

22. The method of claim 21, wherein the first Hot Plug controller is manufactured by a first manufacturer and the second Hot Plug controller is manufactured by a second manufacturer.

* * * * *